July 30, 1968
M. I. HUDIS
3,394,969
CUSHION CRAWLER RAIL FOR THE ENDLESS TRACK OF AN
ELONGATED TYPE CRAWLER TRACTOR
Filed Sept. 16, 1966
2 Sheets-Sheet 1
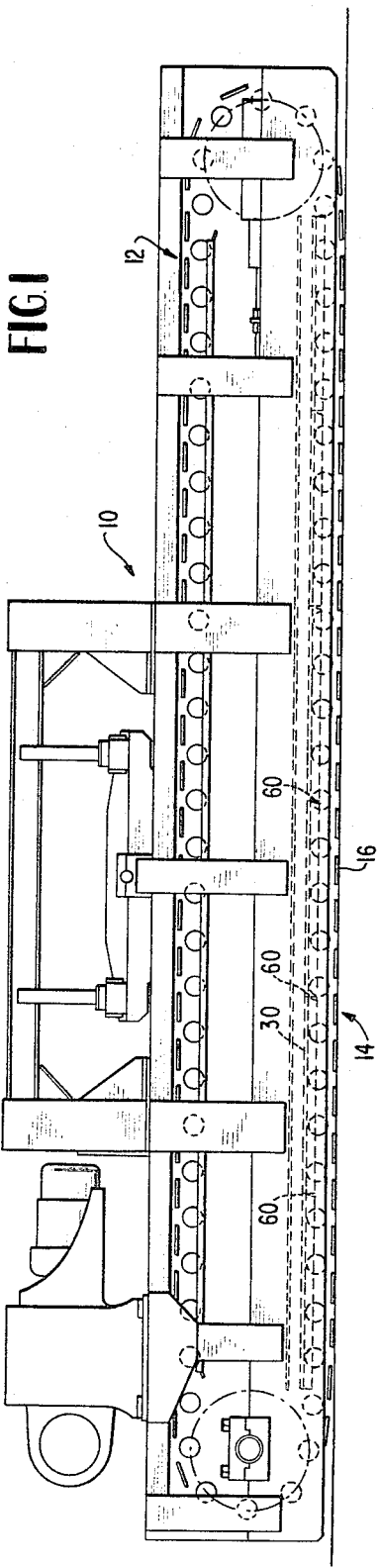
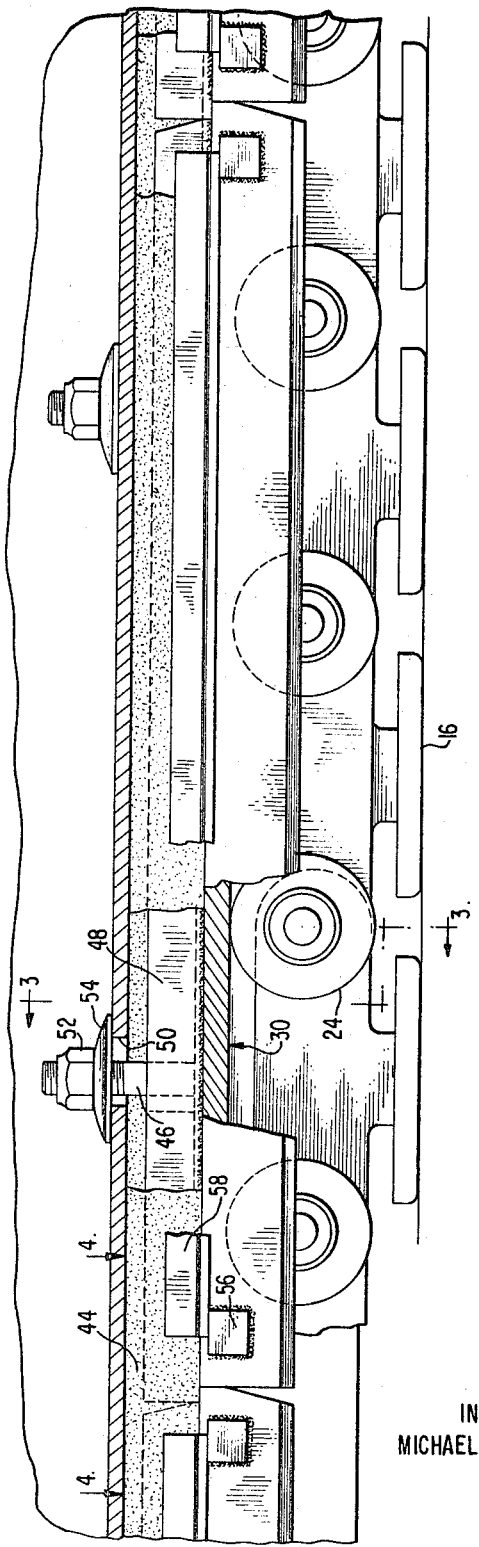
INVENTOR
MICHAEL I. HUDIS
BY Sughrue, Rothwell, Mion, Zinn & Macpeak
ATTORNEYS July 30, 1968     M. I. HUDIS     3,394,969
CUSHION CRAWLER RAIL FOR THE ENDLESS TRACK OF AN
ELONGATED TYPE CRAWLER TRACTOR
Filed Sept. 16, 1966     2 Sheets-Sheet 2
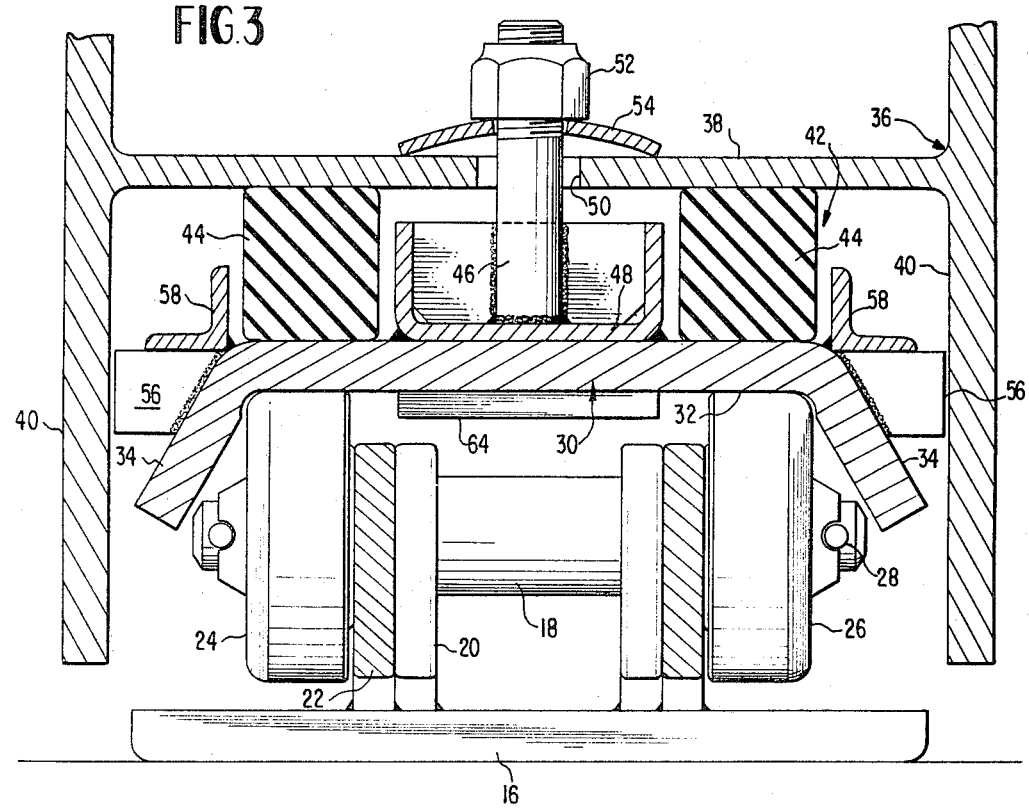
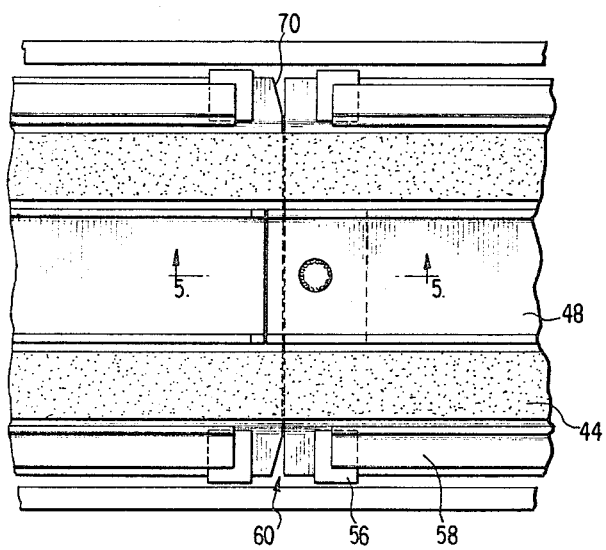
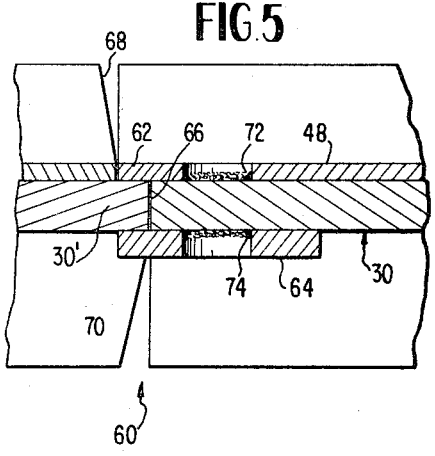
INVENTOR
MICHAEL I. HUDIS
ATTORNEYS and Patented July 30, 1968

United States Patent Office
3,394,969

3,394,969
CUSHION CRAWLER RAIL FOR THE ENDLESS TRACK OF AN ELONGATED TYPE CRAWLER TRACTOR
Michael I. Hudis, Brookfield, Wis., assignor to Rex Chainbelt Inc., Milwaukee, Wis., a corporation of Wisconsin
Filed Sept. 16, 1966, Ser. No. 580,003
7 Claims. (Cl. 305—25)

ABSTRACT OF THE DISCLOSURE

An elongated crawler tractor such as used for slip form pavers, has a cushion crawler rail. The crawler rail is divided into a number of contiguous sections which are pivoted relative to each other at their adjoining ends, for example by tongue and groove joints. The crawler rail is cushioned from the side beam by an elongated resilient cushion of solid material, such as rubber, positioned between the guide rail and side beam along the entire length of the guide rail.

---

This invention relates to improvements in elongated crawler type tractors such as used in construction, for example as slip form concrete pavers; and more particularly relates to a cushioned crawler rail for the endless track assemblies of such tractors.

Slip form concrete pavers are known in the art for constructing concrete pavement without the use of conventional road forms. In such pavers endless tracks carrying guide rollers are supported and guided from side frame beams of the paver. These beams are very long, for example 22 feet, and as they are conveyed along by the endless track they include a long straight edge which provides the slip forms. The paver is in effect an elongated crawler type tractor and is moved over a prepared road bed.

With slip form pavers there has been a long existing problem which has been researched for a number of years without previous solution. The problem is that errors in the finished pavements can be caused by an unevenness, even slight, in the road bed which is contacted by the endless tracks. This unevenness might be in the grade or might be a bolt or something left on the road bed. When the elongated track starts over the unevenness it tends to magnify the error due to the elongated rigid construction of the side frame beams. This invention provides an elongated crawler tractor endless track assembly suspension which digests and overcomes such minor irregularities in the grade or road bed by cushioning the endless track between a crawler guide rail and the side beam. Moreover, the crawler guide rail is articulated for limited movement so that any minor grade errors or irregularities are not magnified from crawler rail section to section.

It is difficult in the crawler tractor art to provide uniform pressure or load on the track shoes or pads when bumps in the surface are contacted by the crawler track. When uniform pressure can be obtained on all track shoes one shoe pin is not loaded more than another and better traction can be obtained. This is highly desirable in construction machinery. This invention provides uniform pressure on the crawler shoes by resilient cushioning between a crawler guide rail and supporting side beam so that any extra pressure on one crawler shoe tends to be spread out on other and adjacent shoes.

In one type of prior known slip form paver and endless track assembly the endless track would occasionally jump its guide rail. This was because the track was guided by a flanged roller cooperating with the guide rail and the flange of the roller was not long. By the construction of this invention, in which non-flanged rollers are guided on an inverted U-shaped crawler guide rail, jumping of the guide rail by the endless track is prevented.

This invention further provides a unique mounting assembly for the endless track of an elongated crawler type tractor with a minimum number of parts and a construction which allows easy track replacement.

Other features of the invention will be pointed out in the following description and claims and illustrated in the accompanying drawings, which disclose by way of example, the principle of the invention and the best mode which has been contemplated of applying that principle.

In the drawings:

FIG. 1 is a side elevation view of a slip form concrete paver incorporating a cushioned crawler rail of this invention in an endless track assembly;

FIG. 2 is an enlarged detail side elevation with some of the components broken away and shown in section for the sake of clarity of explanation;

FIG. 3 is a sectional view taken along line 3—3 of FIG. 2;

FIG. 4 is a fragmentary sectional view taken along line 4—4 of FIG. 2; and

FIG. 5 is a sectional view taken along line 5—5 of FIG. 4.

Referring to the drawings, an elongated crawler type tractor 10 is illustrated in FIG. 1 as a slip form concrete paver which may be of the type shown in U.S. Patent No. 3,247,770. The tractor 10 includes an elongated endless track assembly 12 on each side thereof. Since both track assemblies are identical only one is shown and need be described. The endless track assembly includes an endless track 14 composed of a plurality of shoes 16 pivotally connected together by pins 18 extending through lugs 20 and 22 protruding from adjacent shoes, see FIGS. 2 and 3. Rollers 24, 26 are mounted on the ends of pin 18 and are retained thereon by suitable retaining means 28, see FIG. 2.

A sectional crawler rail 30 is used to guide the endless track assembly, and as shown in FIG. 3 is of generally U-shape with diverging legs. A U-bottom 32 guides the periphery of the rollers 24 and 26 while U-legs 34 prevent shifting of the track 14 laterally of the rail.

The crawler guide rail 30 is supported from an elongated side beam 36 which extends the length of each side of the elongated crawler tractor 10. The side beam 36 may be shown as an H beam with a central web 38 and flanges 40.

Between the side beam 36 and the crawler guide rail 30 there is a resilient cushion 42. This resilient cushion is formed by a pair of elongated spaced apart rubber blocks 44, 44.

For holding the crawler guide rail 30 in relation to the side beam 36 a stud 46 is welded to a channel 48 which in turn is welded to the crawler rail 30. The stud 46 extends through a hole 50 in central web 38 of side beam 36 and has a nut 52 threaded on the outer end thereof. A spherical washer 54 is positioned between the nut 52 and the web 38 so as to apply resilient pressure when the nut is tightened. The hole 50 is large enough to allow the entire crawler guide rail 30 to shift in various directions and the resiliency of spherical washer 54 tends to return it to a central position after it has been compressed.

Crawler guide rail 30 carries side stops 56 at opposite sides thereof. These side stops cooperate with the inside of flanges 40 to limit the sideways movement of the crawler guide rail 30. At the top of the side stops are rubber block retainers 58 in the form of angle irons welded to the back of the crawler guide rail.

The crawler guide rail 30 is in a plurality of sections which may articulate a limited distance relative to each other in both a vertical and horizontal plane. These rail joints 60 are shown in FIG. 1 and it can be seen that there are a number of them in an elongated tractor. For example, there may be six joints spaced over three feet apart in a 22 foot long tractor.

The joints are shown in more detail in FIGS. 4 and 5. Channel 48 has an extension 62 beyond one end of one crawler guide rail section 30. A plate 64 also extends beyond the same end of crawler rail 30 below the surface thereof in the bottom 32 of the U-shaped portion. The extension 62 and plate 64 together with the end of one crawler section 30 provide a tongue and groove joint 66 with a slight amount of clearance for the adjacent crawler section 30', see FIG. 5. The clearance of the tongue and groove joint is enough to allow sufficient pivotal movement to cure misalignment occasioned by minor grade irregularities. In other words, pivotal movement allowed section 30 with regard to crawler rail section 30' is limited, but this limited movement is all that is needed. The top edge of channel 48 of the adjacent section is cut back along face 68 and the track legs 34 are cut back along end face 70 as shown in FIGS. 4 and 5 to allow this pivotal movement in a vertical plane. The rail sections 30 and 30' can also partake of some limited pivotal movement in a horizontal plane for the same purpose of curing misalignment. Plug welding holes 72 and 74 are provided in channel 48 and plate 64, respectively, for securing them to crawler guide section 30.

In operation, a slight irregularity or error in the grade which the endless track 14 encounters would, in prior art constructions, pivot the entire rigid tractor throwing the concrete pavement produced thereby out of true with regard to the desired top pavement surface. However, with the rubber blocks 44 between the crawler rail 30 and the side beam 36 any irregularity will compress the rubber blocks and not tilt the entire tractor. Moreover, even when an irregularity might tilt one of the crawler rail sections 30 it will not tilt the adjacent crawler rail section 30' due to the limited pivotal movement allowed between the sections in a vertical plane. This arrangement, including the resilient cushion 42 allows uniform pressure to be placed on all of the shoes 16 of the endless track 14 even though one shoe may encounter an obstacle or surface irregularity. The U-legs 34 in combination with the flangeless rollers 24 and 26 provide a guide for the endless track 14 and improve tracking conditions while preventing the track from jumping the rail. The minimum number of parts and the simple bolt assembly allow for easy replacement and inexpensive though rugged construction.

While the invention has been particularly shown and described with reference to a preferred embodiment thereof, it will be understood by those skilled in the art that various changes in form and details may be made therein without departing from the spirit and scope of the invention.

What is claimed is:

1. An elongated crawler type tractor such as a slip form paver having a construction to absorb and smooth out undulations in a grade over which the crawler tractor moves, the construction comprising;
   (a) an endless track with a plurality of articulated shoes,
   (b) rollers carried by at least some of the shoes of the endless track,
   (c) an elongated crawler guide rail diivded into more than two contiguous sections positioned above the lower track run for guiding the rollers and hence the endless track,
   (d) means on the adjacent ends of the crawler guide rail sections for allowing limited articulation of each section relative to the adjacent section,
   (e) a side beam for supporting the crawler rail sections therebeneath, and
   (f) an elongated resilient cushion of solid resilient material such as rubber positioned between the guide rail and side beam along the entire length of the guide rail.

2. A cushioned crawler rail as in claim 1 wherein the crawler rail is generally U-shaped in section with diverging sides.

3. A cushioned crawler rail as in claim 2 wherein the elongated resilient cushion includes at least a pair of spaced apart elongated rubber blocks.

4. A cushioned crawler rail as in claim 3 further including a stud attached to the crawler rail and extending through a hole of larger size than the stud in the side beam, a nut on the stud, and a spherical spring washer between the nut and the side beam.

5. A cushioned crawler rail as in claim 3 further including side stops on the cushioned crawler sections cooperating with flanges of the side beam to limit lateral movement of the cushioned crawler rail sections.

6. A cushioned crawler rail as in claim 3 further including retainers for the spaced apart rubber blocks, the retainers being attached to the crawler rail outside of the position of the rubber blocks.

7. A cushioned crawler rail as in claim 1 wherein the means allowing limited articulation is a tongue and groove joint between ends of adjacent crawler rail sections.

References Cited

UNITED STATES PATENTS

| | | | |
|---|---|---|---|
| 1,571,628 | 2/1926 | Hendrickson | 305—27 |
| 1,763,826 | 6/1930 | Smyth | 180—9.54 |
| 1,772,714 | 8/1930 | Gilland | 305—18 |
| 2,775,492 | 12/1956 | Wirkkala | 305—28 |
| 2,934,383 | 4/1960 | Barnes | 305—18 |

RICHARD J. JOHNSON, *Primary Examiner.*